United States Patent
Takeuchi et al.

(10) Patent No.: US 11,113,994 B2
(45) Date of Patent: Sep. 7, 2021

(54) LABEL CLIP

(71) Applicant: Go!Foton Holdings, Inc., Somerset, NJ (US)

(72) Inventors: Kenichiro Takeuchi, North Brunswick, NJ (US); Haiguang Lu, Los Altos, CA (US)

(73) Assignee: Go!Foton Holdings, Inc., Somerset, NJ (US)

( * ) Notice: Subject to any disclaimer, the term of this patent is extended or adjusted under 35 U.S.C. 154(b) by 0 days.

(21) Appl. No.: 15/774,133

(22) PCT Filed: Apr. 27, 2018

(86) PCT No.: PCT/US2018/029841
§ 371 (c)(1),
(2) Date: May 7, 2018

(87) PCT Pub. No.: WO2018/200984
PCT Pub. Date: Nov. 1, 2018

(65) Prior Publication Data
US 2020/0058237 A1 Feb. 20, 2020

Related U.S. Application Data

(60) Provisional application No. 62/491,411, filed on Apr. 28, 2017.

(51) Int. Cl.
*G09F 3/00* (2006.01)
*G09F 3/16* (2006.01)
(Continued)

(52) U.S. Cl.
CPC .............. *G09F 3/0295* (2013.01); *G09F 3/16* (2013.01); *G09F 3/205* (2013.01); *H01B 7/368* (2013.01); *H01R 13/465* (2013.01)

(58) Field of Classification Search
CPC .. G09F 3/00; G09F 3/205; H01R 4/20; H01R 11/11; H01R 11/18; H01R 13/20;
(Continued)

(56) References Cited

U.S. PATENT DOCUMENTS 3,450,828 A * 6/1969 Joly ..................... H01R 13/465
174/75 R
3,491,472 A * 1/1970 Walldorf ................ H01B 7/368
40/316
(Continued)

FOREIGN PATENT DOCUMENTS

WO 2016162377 A1 10/2016

OTHER PUBLICATIONS

International Search Report and Written Opinion for Application No. PCT/US2018/029841 dated Jul. 13, 2018.

*Primary Examiner* — Cassandra Davis
(74) *Attorney, Agent, or Firm* — Lerner, David, Littenberg, Krumholz & Mentlik, LLP

(57) ABSTRACT

The present disclosure is directed to a label clip assembly comprising an annular clip having an inner surface and an outer surface radially positioned around a primary axis, and having a height extending in the direction of the primary axis, a label member attached to the outer surface of the clip, and a plurality of projections extending radially from the inner surface of the clip towards the primary axis. The projections may be configured to permit sliding of the clip onto a cable in a first direction and to avoid the clip sliding off the cable in an opposite direction when the clip is engaged with the cable by the projections.

18 Claims, 7 Drawing Sheets

(51) Int. Cl.
*H01R 13/46* (2006.01)
*G09F 3/20* (2006.01)
*H01B 7/36* (2006.01)

(58) Field of Classification Search
CPC ........ H01R 13/46; H01R 13/64; G02B 6/387; G02B 6/38
USPC .................................. 40/316; 439/488–491
See application file for complete search history.

(56) References Cited

U.S. PATENT DOCUMENTS

| | | | | |
|---|---|---|---|---|
| 4,947,568 A * | 8/1990 | De Barbieri | ............... | G09F 3/16 40/316 |
| 5,187,887 A * | 2/1993 | Mori | ...................... | H01R 11/12 40/316 |
| 5,511,331 A * | 4/1996 | Morosini | .................. | G09F 3/04 40/316 |
| 6,409,392 B1 * | 6/2002 | Lampert | ............... | G02B 6/3879 385/56 |
| 6,651,362 B2 * | 11/2003 | Caveney | ................. | G09F 3/205 40/316 |
| 7,552,849 B2 * | 6/2009 | Gouldson | .......... | A47G 25/1428 223/85 |
| 7,612,288 B1 * | 11/2009 | Gundogan | ........... | H01R 9/2475 174/112 |
| 7,766,198 B2 * | 8/2010 | Mainetti | ............ | A47G 25/1428 223/85 |
| 2002/0076164 A1 | 6/2002 | Childers et al. | | |
| 2003/0017742 A1 * | 1/2003 | Bond | ...................... | G09F 3/205 439/491 |
| 2008/0112682 A1 | 5/2008 | Ishii et al. | | |
| 2009/0139743 A1 | 6/2009 | Smith | | |
| 2012/0301087 A1 * | 11/2012 | Cunningham | ....... | H01R 13/465 385/78 |
| 2018/0113259 A1 * | 4/2018 | Zhu | ...................... | G02B 6/3825 |
| 2018/0286289 A1 * | 10/2018 | Liversidge | ............. | G09F 3/0295 |

* cited by examiner

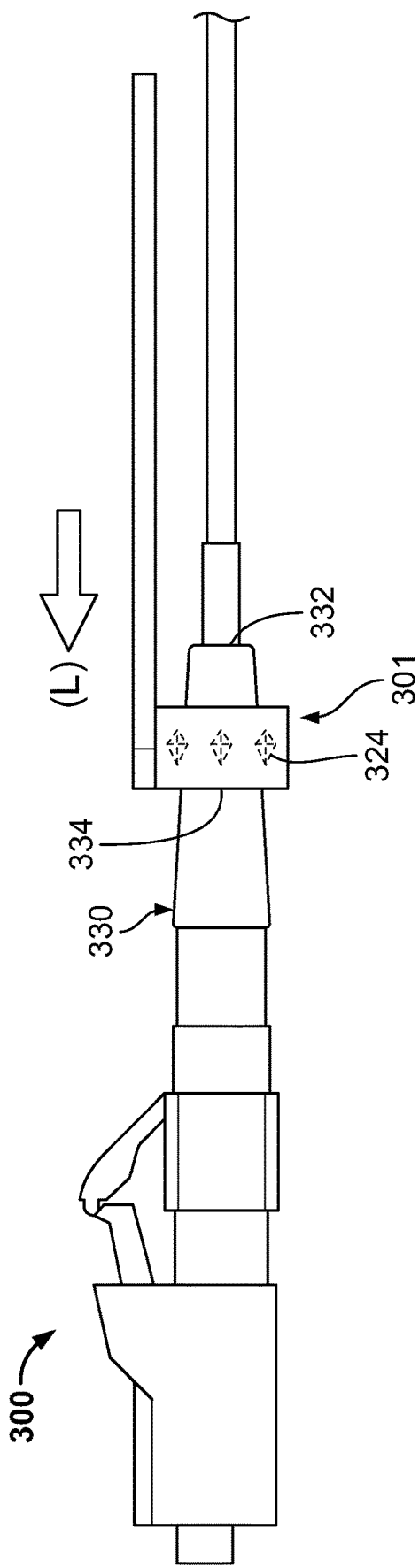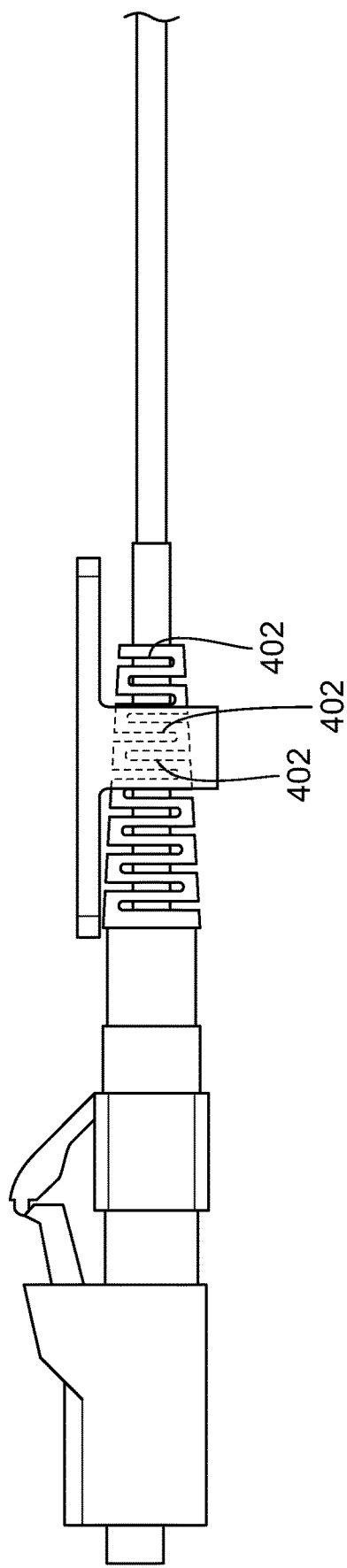

LABEL CLIP

CROSS-REFERENCE TO RELATED APPLICATION

The present application is a national phase entry under 35 U.S.C. § 371 of International Application No. PCT/US2018/029841 filed Apr. 27, 2018, which claims priority from U.S. Provisional Application No. 62/491,411, filed Apr. 28, 2017, all of which are incorporated herein by reference.

BACKGROUND OF THE INVENTION

It is generally desired to be able to identify and distinguish individual wires and cables in a bundle from one another. One known solution for distinguishing wires and cables is to print indicia on an adhesive tag, and then wrap the adhesive tag around a respective cable or wire. However, adhesive tags are commonly not reusable and may become unintentionally detached or unreadable based on wear and tear during use of the cable or wire. Another known solution is to apply a small snap-on marker to the cable or wire. However, snap-on markers are small and not customizable, and do not provide the space for a user to write whatever he or she wants on the marker.

BRIEF SUMMARY OF THE INVENTION

The present disclosure is directed to a clip that permits for attachment of a customized label to a cable. In some embodiments, the clip may be removably attachable to the cable.

In one aspect of the disclosure, a label clip assembly comprises: an annular clip having an inner surface and an outer surface radially positioned around a primary axis, and having a height extending in the direction of the primary axis; a label member attached to the outer surface of the clip; and a plurality of projections extending radially from the inner surface of the clip towards the primary axis. The projections may be configured to permit sliding of the clip onto a cable in a first direction, and to obstruct sliding of the clip in an opposite direction when the clip is engaged with the cable by the projections. The label member may extend lengthwise in the direction of the primary axis.

In some examples, each projection may include a front edge extending from the inner surface of the clip at an angle greater than 90 degrees, and a back edge extending from the inner surface of the clip at an angle less than 90 degrees. The front edge may be configured to permit sliding of the clip onto the cable in the first direction. The back edge may be configured to avoid sliding of the clip in the opposite direction. The clip may be made of polycarbonate, polycarbonate acrylonitrile butadiene styrene, or the like.

In some examples, the annular clip may further include a slit extending from the inner surface to the outer surface along the height of the clip. The slit may have a width of 1 millimeter or less. The clip may be capable of being pried open at the slit to accommodate a cable being inserted into the annular cavity of the clip.

In further examples, the label clip assembly may include a second annular clip having an inner surface and an outer surface radially positioned around a second axis parallel to the primary axis, and having a height extending in the direction of the second axis, a second label member attached to the outer surface of the second clip, and a second plurality of projections extending radially from the inner surface of the second clip towards the second axis, wherein the second plurality of projections are configured to permit sliding of the second clip onto a second cable in the first direction and to obstruct sliding of the second clip in the opposite direction when the second clip is engaged with the second cable by the second plurality of projections. The label clip assembly may further include a tab connecting the first label member to the second label member.

Another aspect of the disclosure provides for an optical cable assembly comprising: an optical cable; a cable boot connected to an end of the optical cable; and a label clip assembly as described in any of the embodiments herein.

In some examples, the cable boot may be tapered such that it has a wide end and a narrow end. The optical cable may be connected to the narrow end of the cable boot. The diameter of the annular cavity of the clip may greater than the diameter of the narrow end and less than the wide end. The cable boot may include a plurality of grooves, such that the plurality of projections may be adapted to engage with the grooves in the cable boot in order to avoid sliding of the clip off of the cable. The cable boot may be made of a material that is softer than the material of the plurality of projections, thereby improving the engagement between the projections and the boot.

Yet another aspect of the disclosure provides for a method of labeling an optical cable. The method may involve inserting the optical cable into a cavity of an annular clip, and sliding the annular clip in a first direction to engage a cable boot. The annular clip may have an inner surface and an outer surface radially positioned around a primary axis. The annular clip may further have a height extending in the direction of the primary axis. The annular clip may further include a plurality of projections extending radially from the inner surface of the clip towards the primary axis. The annular clip may further have a label member attached to its outer surface. The cable boot may be connected to an end of the optical cable. The plurality of projections may be configured to avoid the clip sliding off the cable in a second direction opposite the first direction when the clip is engaged with the cable boot.

In some examples, the method may further involve writing on the label member, such that the optical cable is identifiable based on the writing on the label member. The annular clip may further include a slit extending from the inner surface to the outer surface along the height of the clip, such that inserting the optical cable into the cavity of the annular clip further involves passing the optical cable through the slit. In some cases, the width of the slit may be less than the diameter of the optical cable, such that inserting the optical cable into the cavity of the annular clip further involves initially prying open the slit to accommodate the optical cable being inserted.

In further examples, the method further may further involve labeling a second optical cable with a second annular clip, whereby each of the annular clip and the second annular clip are connected to one another (e.g., by a tab), and the annular clips may be engaged to the respective cable boots of the optical cables in a single sliding motion.

BRIEF DESCRIPTION OF THE DRAWINGS

FIG. 3 is an illustration of a label clip being affixed to a cable boot in accordance with an aspect of the disclosure.

FIG. 4 is an illustration of a label clip affixed to a cable boot in accordance with an aspect of the disclosure.

DETAILED DESCRIPTION

Figure 1:
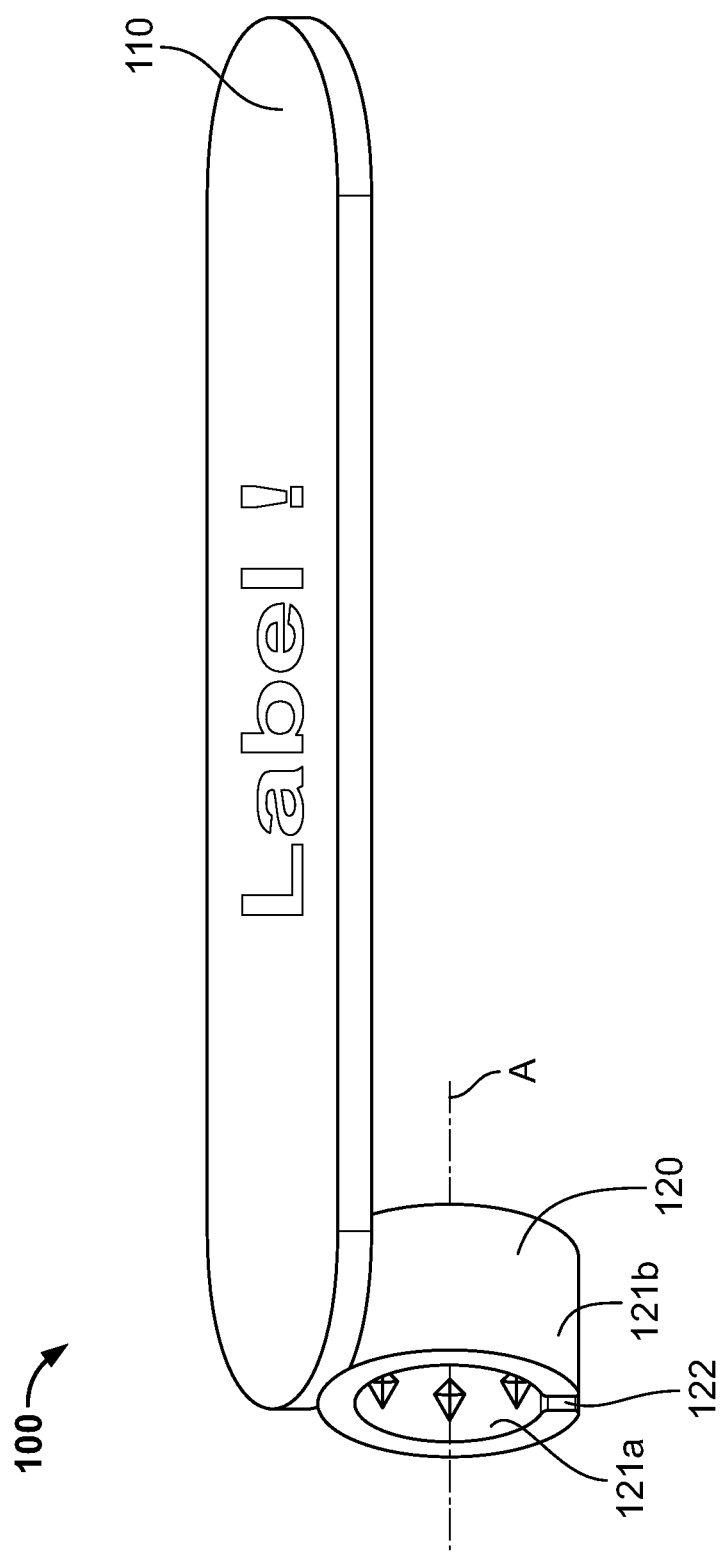
FIG. 1 is an illustration of a label attached to a label clip in accordance with an aspect of the disclosure.

FIG. 1 shows an assembly 100 including an annular clip 120 having an inner surface 121a and outer surface 121b positioned radially around a primary axis A, and having a height extending in the direction of the primary axis A. The assembly further includes a label member 110 attached to the outer surface 121b of the clip 120 and extending lengthwise in the direction of the primary axis A. The assembly, or at least some parts of the assembly, may be made of a rigid, semi-rigid or flexible plastic. In some example, the assembly, or at least some parts, may be made of polycarbonate (PC), acrylonitrile butadiene styrene (ABS), polycarbonate acrylonitrile butadiene styrene alloy (PC+ABS), polypropylene (PP), polyvinyl chloride (PVC), or other similar alloys.

In the example of FIG. 1, the label member 110 is oval shaped, and one end of the oval is attached to the outer surface of the clip 120. In other examples, the label member may be another planar shape (e.g., circular, rectangular, etc.), and may be attached to the outer surface of the clip 120 from a midpoint (such as is illustrated in the example of FIG. 4).

The label member 110 may include a rigid or semi-rigid frame have a thickness of between about 0.5 and 3 millimeters. The user may write custom indicia on a sticker (not shown), and affix the sticker to the frame. Alternatively, the label member 110 may itself be made of a material commonly used in adhesive tags, such that the user may write directly on the label member 110. In the example of FIG. 1, the label member's thickness is about 1.5 millimeters.

Figure 2:
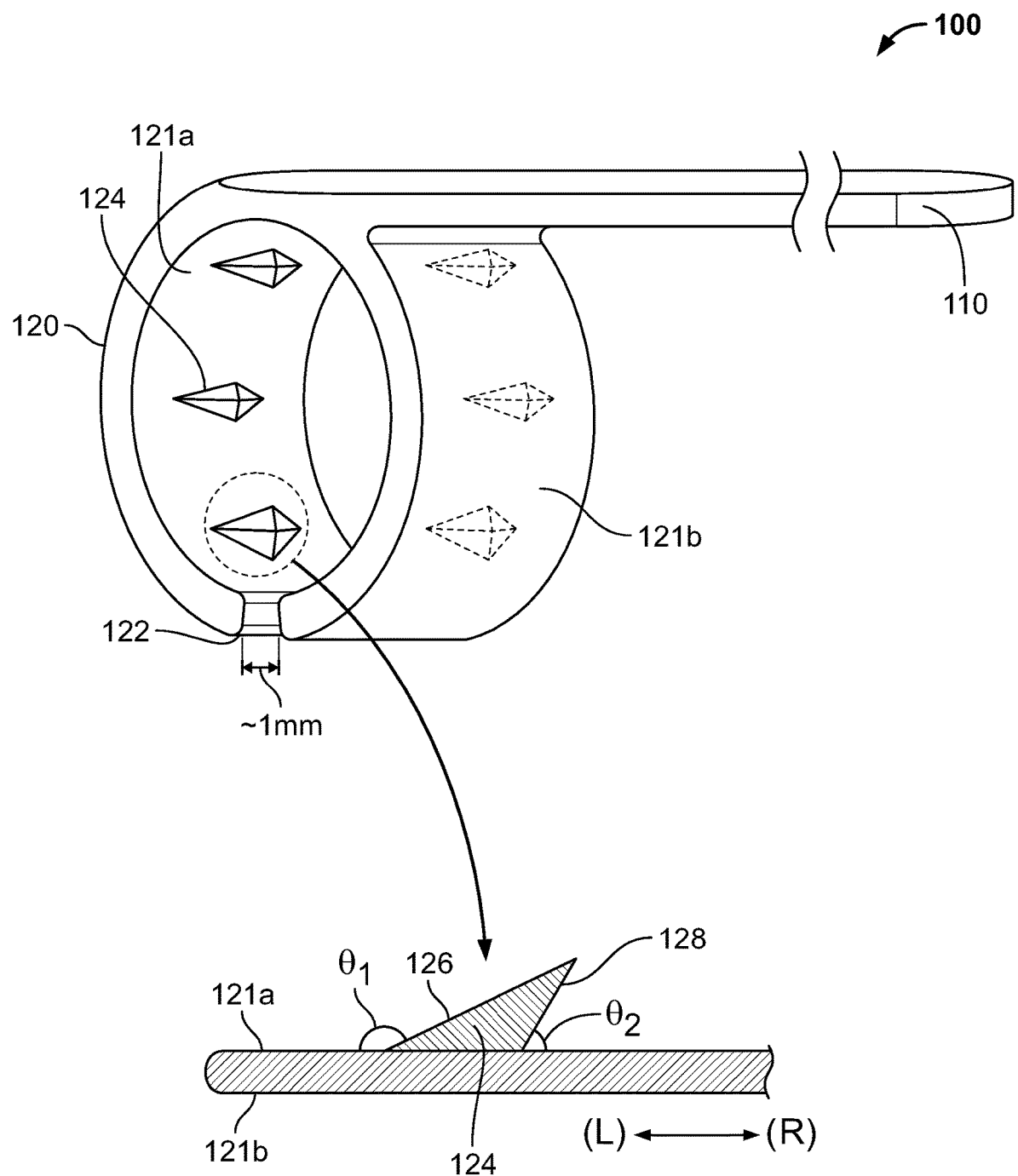
FIG. 2 is an illustration of a label clip in accordance with an aspect of the disclosure.

The clip 120, as shown in greater detail in FIG. 2, may include a slit 122. The slit 122 extends fully from the outer surface 121b to the inner surface 121a of the clip 120, such that the clip 120 forms a broken annulus. The slit also extends the full height of the clip. The thickness of the clip 120 may depend on the type of cable (or cable connector) that the clip is designed to engage. In some cases, the thickness (i.e., thickness of the annulus) may be between about 0.5 and 2 millimeters, and a height (i.e., height of the cylinder formed by the annulus) may be between about 3 and 10 millimeters. In the example of FIG. 2, the clip 120 has a thickness of about 1 millimeter and a height of about 5 millimeters.

The width of the slit may depend on the size of the cable for which it is designed to engage. In some instances, the slit 122 may be designed to be wider than a cable to which the clip is affixed, such that the cable can be inserted through the slit 122 into the hollow space of the clip 120, but narrower than a boot at the end of the cable, such that the cable does not slip through the slit 122 when the clip 122 is being affixed to the boot. In other instances in which the clip 120 is made of a flexible material, the slit 122 may be designed to be slightly narrower than the cable but capable of being pried open to allow that the cable can be inserted through the slit 122 into the hollow space of the clip 120. In some such instances, the slit 122 may have negligible width but may be pried open to accommodate insertion of a cable having a diameter of a few millimeters or even a centimeter. Particularly, in the illustrated example of FIG. 2, the slit 122 has a width of about 1 millimeter, and may be used to engage a cable having a diameter of between about 1.2 and 1.6 millimeters.

The inner surface 121a of the clip 120 may include a plurality of projections 124 or barbs, each projection 124 extending radially inward from the inner surface 121a toward the primary axis A. A zoomed view of an example projection 124 is shown in FIG. 2. The projections 124 are configured to allow for the clip 120 to slide over a cable boot in one direction (L) but to avoid or obstruct the clip 120 from sliding off the cable boot in the opposite direction (R). For example, a front edge 126 of each projection 124 may extend from the inner surface 121a of the clip 120 at an angle $\theta_1$ greater than 90 degrees, and a back edge 128 of each projection 124 may extend from the inner surface 121a of the clip 120 at an angle $\theta_2$ less than 90 degrees.

In the example of FIG. 2, the clip 120 includes six projections 124, each projection extending radially between about 0.5 to 1 millimeter(s) from the inner surface 121a of the clip 120. Also, in the example of FIG. 2, the projections 124 are aligned with one another in a circular configuration. In other examples, there may be more or fewer projections (e.g., two projections, four projections, seven projections, etc.), and the projections may be staggered along the height of the clip 120.

FIG. 3 is an illustration of an optical cable 300 with a label clip assembly 301 being slid over the boot 330 of the cable 300. In the example of FIG. 3, the boot 300 is tapered, such that the label clip assembly 301 can easily fit over the narrow end 332 of the boot, but eventually become engaged with the boot at a wider point 334 of the boot (e.g., where the diameter of the tapered boot 330 approximately equals the diameter of the inner surface of the clip 320). The label clip assembly 301 is slid freely in direction (L) until it cannot slide any further, at which point projections 324 have engaged with, such as by latching onto, the boot 330 and avoid the assembly 301 from sliding in direction (R).

In some instances, the cable boot is made of a material that is softer than that of the projections. This allows the projections to effectively "dig" into the cable boot and thereby get caught and latch onto the boot.

Additionally, in some instances, a cable boot may be designed with small grooves on either side to allow the boot to flex back and forth. The illustration of FIG. 4 depicts one such boot 400, having a series of grooves 402 cut into the sides of the boot in an alternating fashion. In such instances, the projections may be configured in size and shape such that they are capable of engaging with the grooves, thereby avoiding the label clip assembly sliding back in the opposite direction.

Figure 5A:
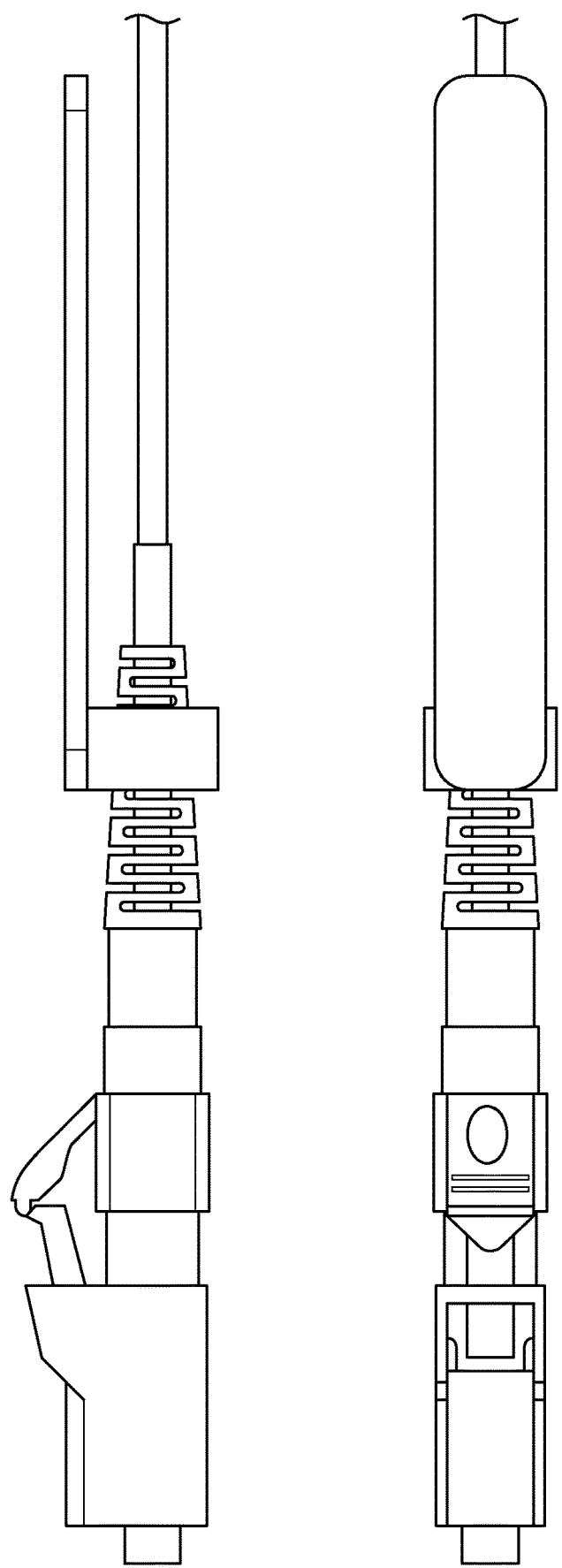
FIG. 5A is an illustration of two cable boots, each with a label clip affixed thereto in accordance with aspects of the disclosure.
Figure 5C:
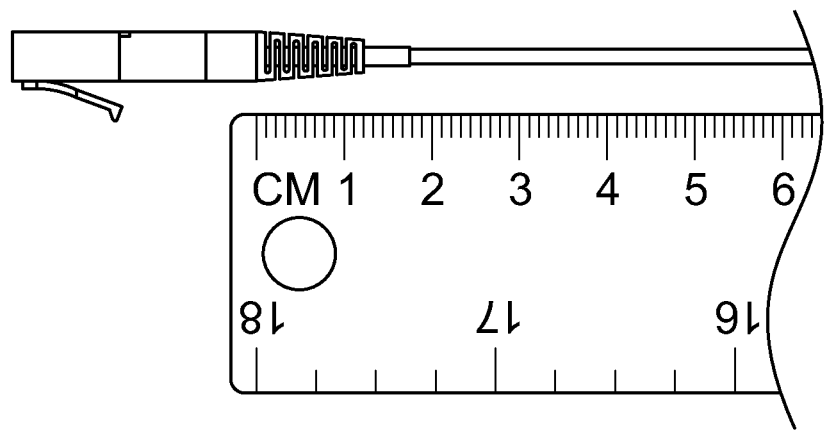
FIGS. 5B and 5C are illustrations of the cable boots shown in FIG. 5A.
Figure 5B:
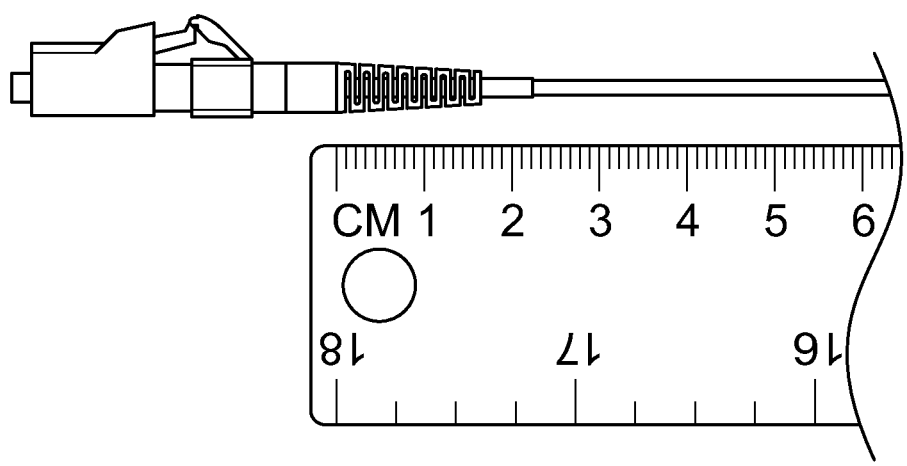

The label clips described in the present disclosure can be designed to fit over cable boots of varying shapes and sizes. For example, FIG. 5A is an illustration of two cables having boots with slightly different geometries. The top and bottom cables can be seen more clearly in FIGS. 5B and 5C, respectively. The boot in FIG. 5B has four more grooves than that of FIG. 5C, is about 2 millimeters longer, and has a slightly shallower taper. Nonetheless, as can be seen from FIG. 5A, a label clip assembly is capable of easily fitting and engaging with so as to become affixed to the boot of either cable.

Figure 6:
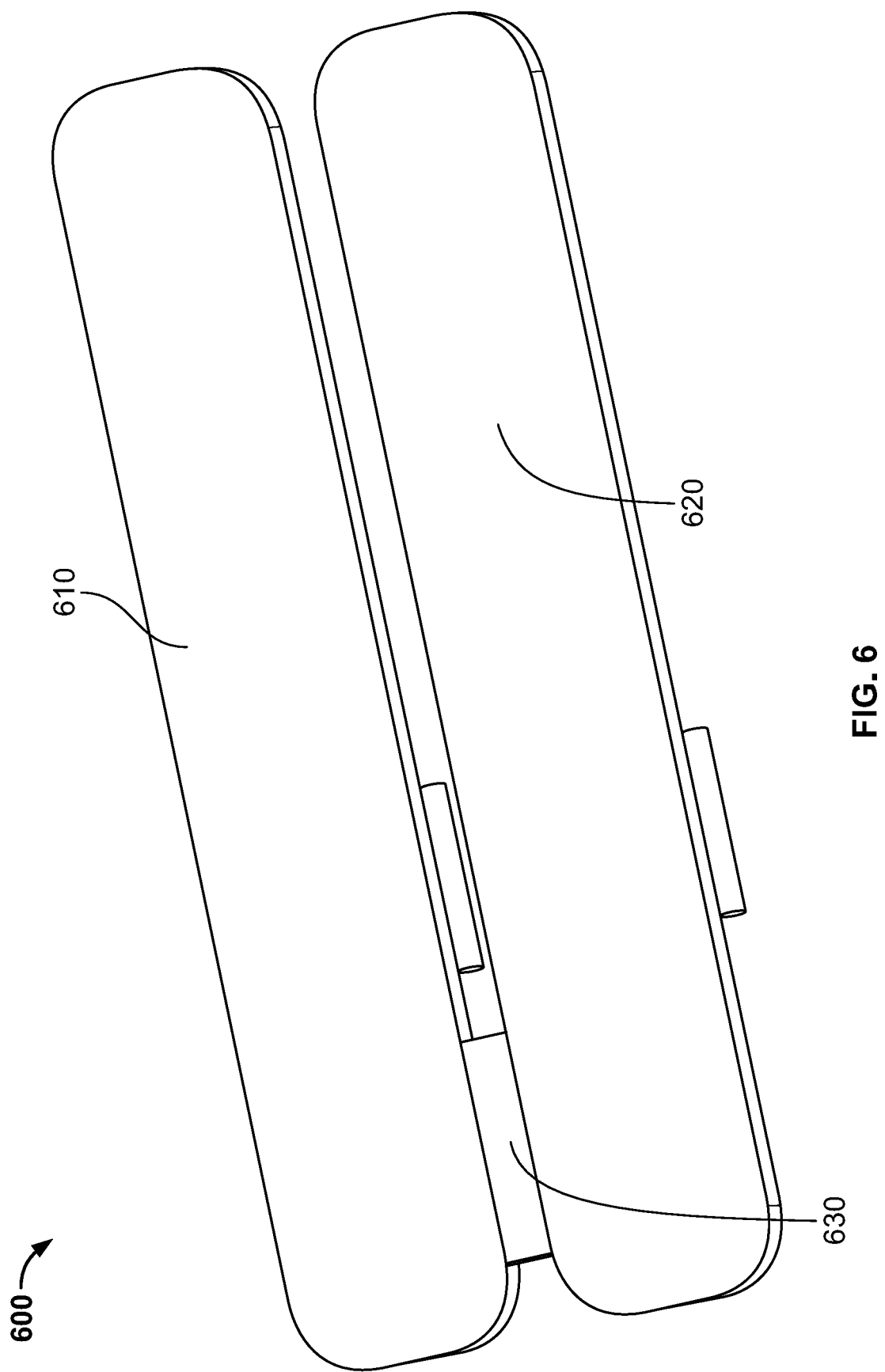
FIGS. 6 and 7 are illustrations of a pair of label clips in accordance with an aspect of the disclosure.
Figure 7:
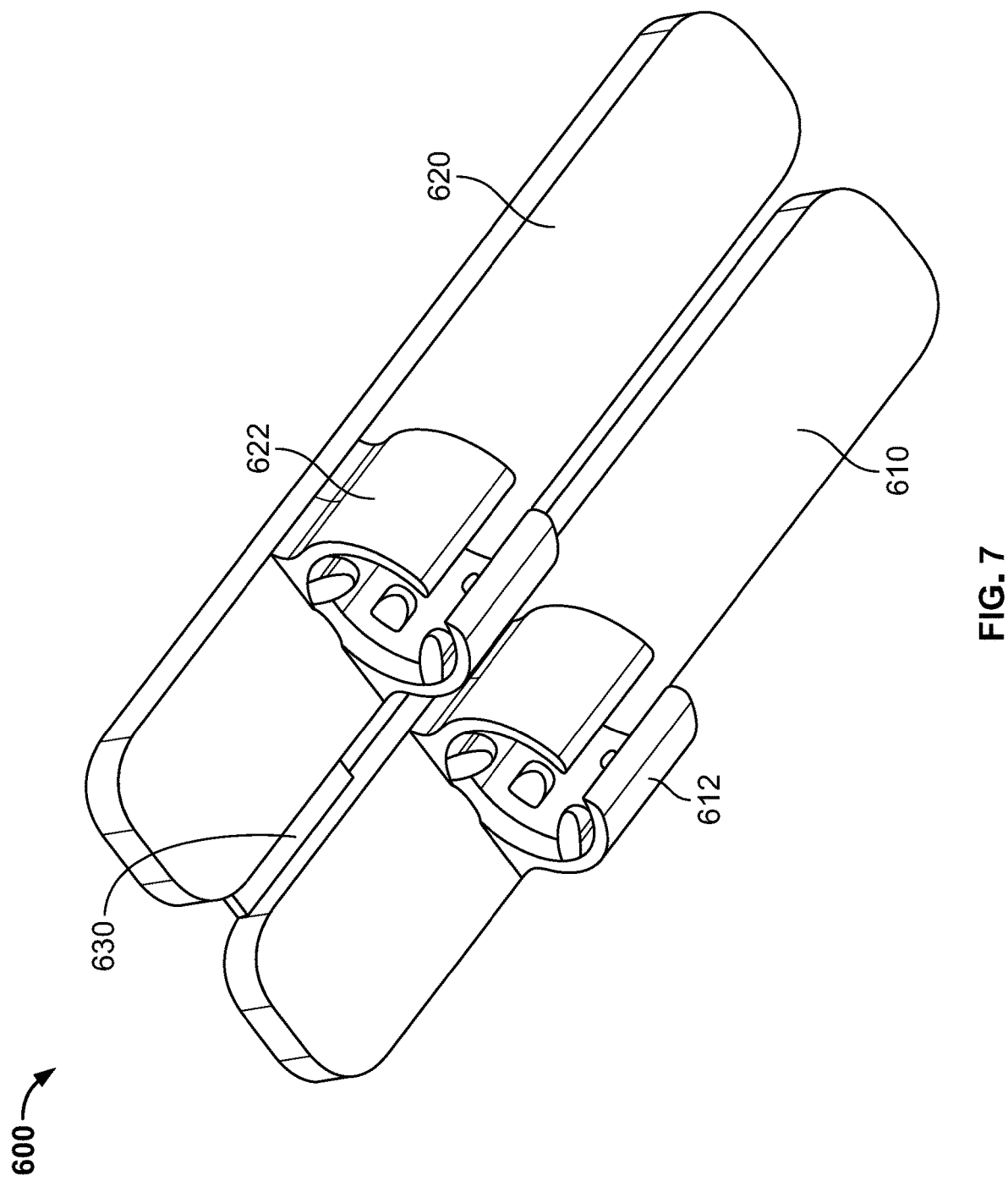

The above examples generally describe a label clip assembly designed to be affixed to a single cable. However, those skilled in the art will recognize that the assembly described herein can also be designed for use with a pair of cables having a duplex connector. FIGS. 6 and 7 illustrate such an assembly 600, which includes a first label member 610 connected to a first annular clip 612 for engaging a first cable and a second label member 620 connected to a second annular clip 622 for engaging a second cable. The first and second label members 610, 620 are further attached to one another by tab 625. If desired, the tab 625 may be broken to separate the label members 610, 620 and respective clips 612, 622 from one another. The assembly 600 enables a user to engage both clips to a pair of cables in a single sliding motion.

The above examples effectively allow for a cable-identifying label to be affixed to a cable's boot without interfering the boot's function, and also without interfering with the cable's ability to bend. As demonstrated in the Figures, the label may be held in place by the label clip at or close to the end of the cable, thereby avoiding the label from becoming entangled with other cables in a bundle.

The above examples generally describe illustrations of a label clip affixed to a boot having a tapered end. However, it should also be appreciated that the clips described herein are capable of attaching to cable boots of various shapes and sizes, and do not per se require the boot to have a tapered end. The label clip can be effectively affixed to any portion of the cable boot's surface that the clip's projections are capable of engaging, such as by digging into or latching onto the surface of the boot.

The above examples generally describe illustrations of a label clip affixed to a boot of a fiber optic cable. However, it will be readily appreciated that the same or similar clips may be affixed to the boots of other types of cables or wires.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A label clip assembly for labelling an optical cable, the label clip assembly comprising:
    an annular clip having an inner surface and an outer surface radially positioned around a primary axis, and having a height extending in the direction of the primary axis;
    a label member attached to the outer surface of the clip; and
    a plurality of projections extending radially from the inner surface of the clip towards the primary axis, wherein the projections are configured to permit sliding of the clip onto a cable in a first direction and are adapted to engage with a cable boot of the optical cable while sliding in the first direction in order to obstruct sliding of the clip in an opposite direction when the projections of the clip are engaged with the cable boot, wherein the cable boot is made of a material that is softer than the material of the plurality of projections.

2. The label clip assembly of claim 1, wherein each projection includes a front edge extending from the inner surface of the clip at an angle greater than 90 degrees, and a back edge extending from the inner surface of the clip at an angle less than 90 degrees, wherein the front edge is configured to permit sliding of the clip onto the cable in the first direction, and wherein the back edge is configured to avoid sliding of the clip in the opposite direction.

3. The label clip assembly of claim 1, wherein the clip is made of a material selected from the group consisting of: polycarbonate; acrylonitrile butadiene styrene; polycarbonate acrylonitrile butadiene styrene; polypropylene; and polyvinyl chloride.

4. The label clip assembly of claim 1, wherein the annular clip further includes a slit extending from the inner surface to the outer surface along the height of the clip.

5. The label clip assembly of claim 4, wherein the slit has a width of 1 millimeter of less, and wherein the clip is capable of being pried open at the slit to accommodate a cable being inserted into the annular cavity of the clip.

6. The label clip assembly of claim 1, wherein the label member extends lengthwise in the direction of the primary axis.

7. The label clip assembly of claim 1, further comprising:
    a second annular clip having an inner surface and an outer surface radially positioned around a second axis parallel to the primary axis, and having a height extending in the direction of the second axis;
    a second label member attached to the outer surface of the second clip;
    a second plurality of projections extending radially from the inner surface of the second clip towards the second axis, wherein the second plurality of projections are configured to permit sliding of the second clip onto a second cable in the first direction and to obstruct sliding of the second clip in the opposite direction when the second clip is engaged with the second cable by the second plurality of projections; and
    a tab connecting the first label member to the second label member.

8. An optical cable assembly comprising the label clip assembly of claim 1 and further comprising:
    the optical cable; and
    the cable boot, wherein the cable boot is connected to an end of the optical cable.

9. The optical cable assembly of claim 8, wherein the cable boot is tapered and includes a wide end and a narrow end, wherein the optical cable is connected to the narrow end of the cable boot, and wherein the diameter of an annular cavity of the clip is greater than the diameter of the narrow end and less than the wide end.

10. The optical cable assembly of claim 8, wherein the cable boot includes a plurality of grooves, and wherein the plurality of projections are adapted to engage with the grooves in the cable boot to avoid sliding of the clip off the cable.

11. A method of labeling an optical cable, comprising:
    inserting the optical cable into a cavity of an annular clip, wherein the annular clip has an inner surface and an outer surface radially positioned around a primary axis, the annular clip further having a height extending in the direction of the primary axis, the annular clip further including a plurality of projections extending radially from the inner surface of the clip towards the primary axis, the annular clip further having a label member attached to the outer surface; and
    sliding the annular clip in a first direction to engage a cable boot, the cable boot being connected to an end of the optical cable, wherein the plurality of projections are configured to avoid the clip sliding off the cable in a second direction opposite the first direction when the clip is engaged with the cable boot; and writing on the label member, whereby the optical cable is identifiable based on the writing on the label member.

12. The method of claim 11, wherein the annular clip further includes a slit extending from the inner surface to the outer surface along the height of the clip, and wherein inserting the optical cable into the cavity of the annular clip further comprises passing the optical cable through the slit.

13. The method of claim 12, wherein the width of the slit is less than the diameter of the optical cable, and wherein inserting the optical cable into the cavity of the annular clip further comprises prying open the slit to accommodate the optical cable being inserted.

14. The method of claim 11, wherein the method further comprises labeling a second optical cable with a second annular clip, wherein each of the annular clip and the second annular clip are connected to one another, and wherein the annular clip is engaged to the cable boot of the optical cable and the second annular clip is engaged to a cable boot of the second optical cable in a single sliding motion.

15. A label clip assembly for labelling an optical cable, the label clip assembly comprising:
    an annular clip having an inner surface and an outer surface radially positioned around a primary axis, and having a height extending in the direction of the primary axis;
    a label member attached to the outer surface of the clip; and
    a plurality of projections extending radially from the inner surface of the clip towards the primary axis, wherein the projections are configured to permit sliding of the clip onto a cable in a first direction and are adapted to engage with grooves in a cable boot of the optical cable in order to obstruct sliding of the clip in an opposite direction when the projections of the clip are engaged with the grooves of the cable boot;
    wherein each projection includes a front edge extending from the inner surface of the clip at an angle greater than 90 degrees, and a back edge extending from the inner surface of the clip at an angle less than 90 degrees, wherein the front edge is configured to permit sliding of the clip onto the cable in the first direction, and wherein the back edge is configured to avoid sliding of the clip in the opposite direction.

16. The label clip assembly of claim 15, wherein the clip is made of a material selected from the group consisting of: polycarbonate; acrylonitrile butadiene styrene; polycarbonate acrylonitrile butadiene styrene; polypropylene; and polyvinyl chloride.

17. The label clip assembly of claim 15, wherein the annular clip further includes a slit extending from the inner surface to the outer surface along the height of the clip.

18. The label clip assembly of claim 15, further comprising:
    a second annular clip having an inner surface and an outer surface radially positioned around a second axis parallel to the primary axis, and having a height extending in the direction of the second axis;
    a second label member attached to the outer surface of the second clip;
    a second plurality of projections extending radially from the inner surface of the second clip towards the second axis, wherein the second plurality of projections are configured to permit sliding of the second clip onto a second cable in the first direction and to obstruct sliding of the second clip in the opposite direction when the second clip is engaged with the second cable by the second plurality of projections; and
    a tab connecting the first label member to the second label member.

* * * * *